UNITED STATES PATENT OFFICE.

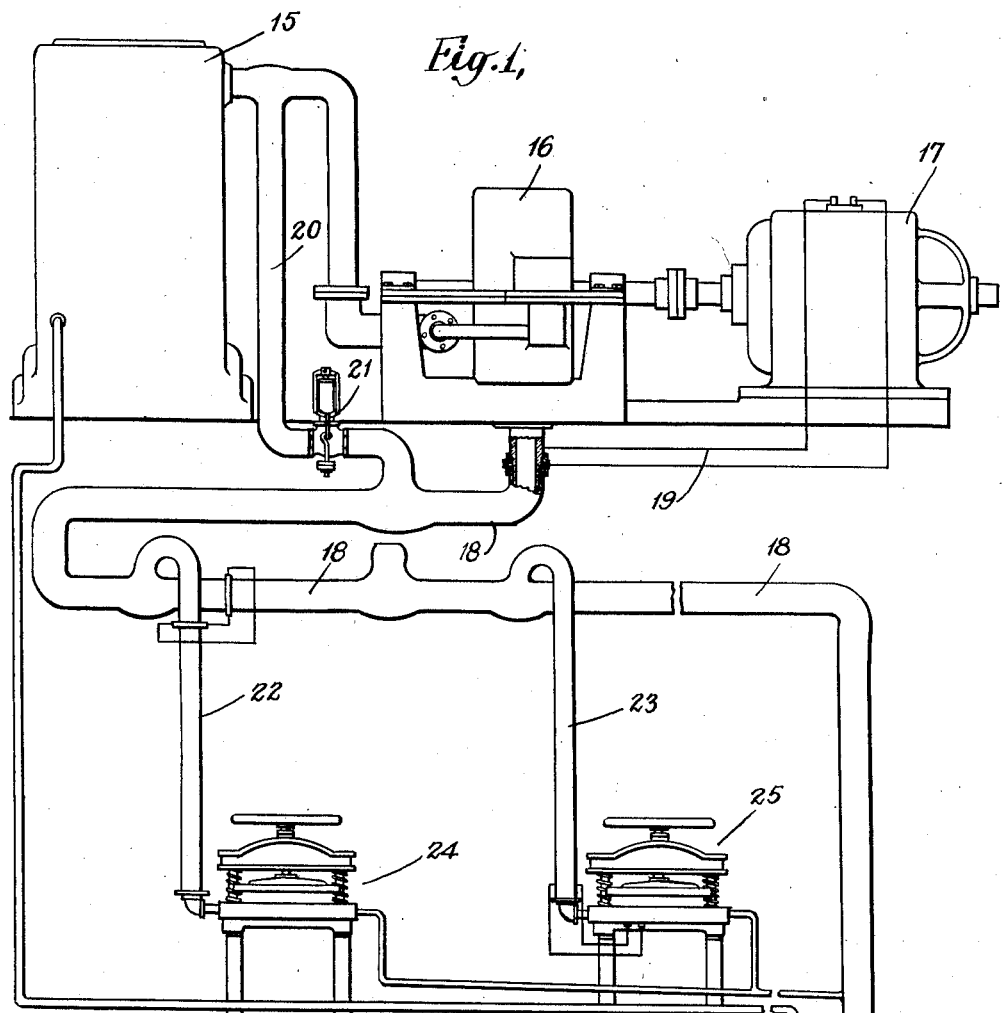
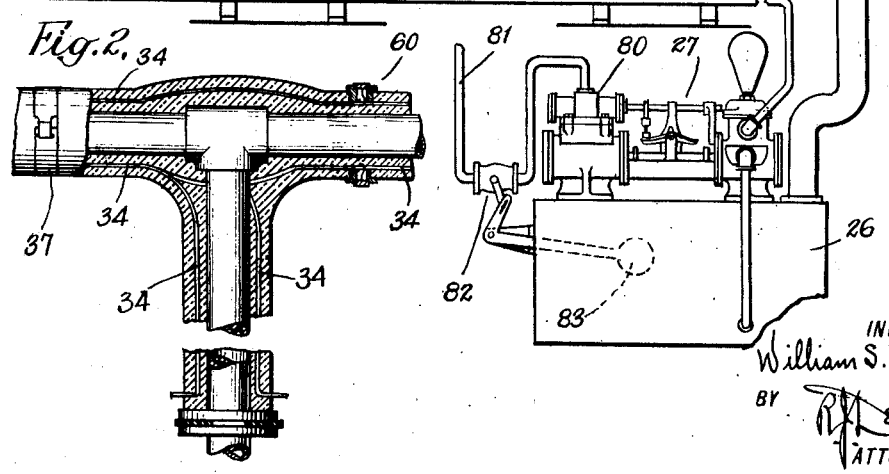

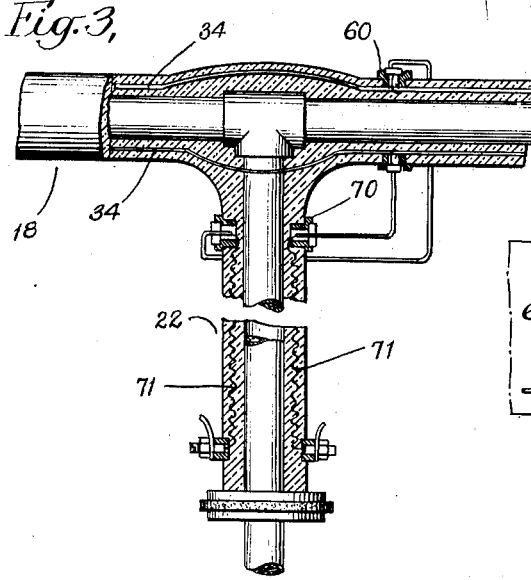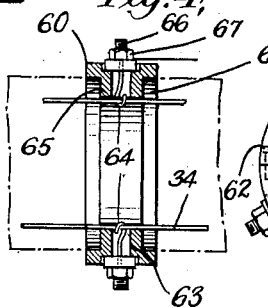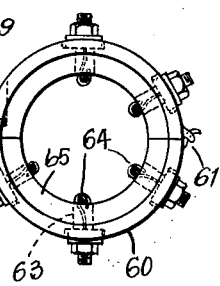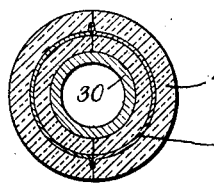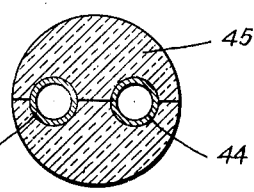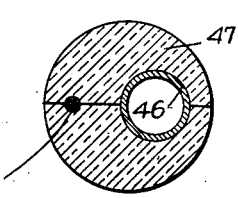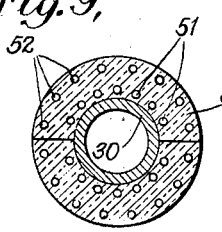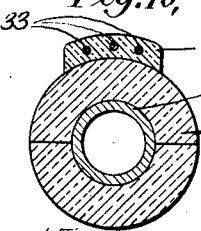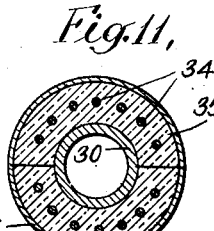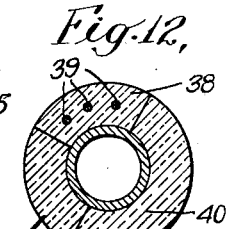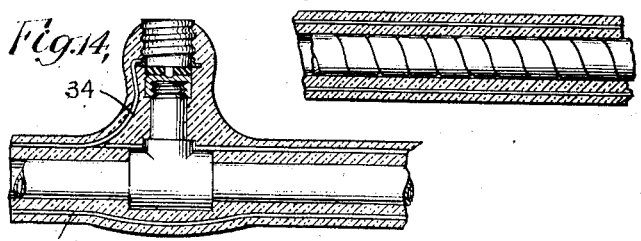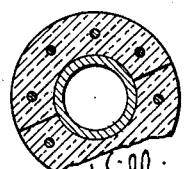

WILLIAM S. HADAWAY, JR., OF NEW ROCHELLE, NEW YORK.

GENERATION AND DISTRIBUTION OF HEAT.

1,383,107. Specification of Letters Patent. Patented June 28, 1921.

Application filed December 16, 1915. Serial No. 67,147.

*To all whom it may concern:*

Be it known that I, WILLIAM S. HADAWAY, Jr., a citizen of the United States of America, and a resident of New Rochelle, Westchester county, and State of New York, have invented certain new and useful Improvements in Generation and Distribution of Heat, of which the following is a specification, reference being had to the accompanying drawings, forming a part thereof.

My invention relates to the generation and particularly to the distribution of heat.

It has hitherto been both difficult and expensive to provide heat for commercial purposes when large quantities of heat at widely different temperatures were required.

Low pressure or exhaust steam constitutes an economical means of supplying large quantities of heat at low temperature, up to about 225° F. for example.

Electricity under ordinary conditions and at the prices now prevalent, can be commercially and economically used for high temperature heating, about 325° F. for example.

If relatively large quantities of heat are required ranging between 225° F. and 325° F. either live steam or gas has been found most economical hitherto.

It is, in fact, not unusual to find a single industrial installation where each of the three heating means mentioned above is utilized. If electricity is purchased from a central station, it is a comparatively simple matter to provide low pressure steam for heating purposes because low pressure boilers are usually to be found and do not require the attention of skilled operators. It is particularly difficult however, to supply large quantities of heat for intermediate temperatures because in order to get live steam it has been considered necessary to provide high pressure boilers or to transmit high pressure steam from some station, the losses being heavy and the initial investment high. Three factors were therefore necessary in a complete heating system, viz., electricity, live or high pressure steam, and exhaust or low pressure steam.

According to my present invention, I materially simplify and reduce the expense of a heating installation having the above outlined requirements and widely extend its usefulness and field of application by eliminating the necessity for supplying live steam and thus reduce the number of factors from three to two.

In carrying out my invention, I depend upon the exhaust or low temperature steam for supplying heat at low temperatures and I rely upon electrically superheated steam for supplying the intermediate range of temperatures in large quantities, the electricity alone being available for providing heat in relatively small quantities at high temperatures.

Although low pressure steam is to be found in a great many industrial plants where heat is required, there are nevertheless an even greater number of industrial plants and a tremendous field, including private residences, where electricity is available and where there is no economical source of low temperature heat such as exhaust or low pressure steam. The usefulness of electricity for heating has therefore been very largely restricted because the greatest demand for heat is in large quantities at relatively low temperatures.

In accordance with my invention, I provide a single structure embodying means for economically transmitting both steam or other heating fluid and electricity, with a view to facilitating, and greatly enlarging the field for the distribution of heat to consumers of either large or relatively small quantities.

As more fully explained hereinafter, I have materially reduced the losses usually incident to the distribution of steam and I have furthermore provided means whereby the temperature of the steam may be either maintained in transmission or increased so that it is delivered at the receiving end at any desired temperature fully covering the usual range of both live and exhaust steam.

One object of my invention is to provide a simple and economical, as well as a particularly flexible heating system.

Another object is to provide a simple and compact unitary structure for transmitting heat energy in large quantities so that it is available for use at temperatures which vary widely.

Another object is to provide a unitary distributing carrier for steam and electricity comprising a common insulator for preventing the radiation of heat from the steam carrier and supporting an electric current conductor or conductors, the steam pipe or carrier preferably constituting one side of the circuit.

Another object is to utilize the heat losses to which electric distributing systems are subject, to prevent the condensation in steam carriers.

Another object is to provide means for utilizing electricity to prevent condensation in steam carriers for the purpose of either maintaining the temperature of the steam or making it possible to transmit the steam to relatively great distances.

Another object is to provide a system of heat distribution comprising a steam carrier and electro-responsive means for superheating the steam between the distributing main and the point of use, thereby eliminating the necessity of additional heating means in the apparatus where the heat is consumed.

Another object is to provide a heat distributing system in which steam or some other economical source of low temperature heat may be continuously utilized to keep the heat consuming apparatus at a moderate temperature, and in which electricity is utilized whenever it is desired to raise the temperature at the apparatus.

Another object is to provide for the ready control and manipulation of heat consuming devices, thereby combining the advantages of electric heaters with the economies of steam heated apparatus.

Another object is to provide a system of distributing heat which shall deliver heated vapor at a controllable temperature, to machines such as are already in use and are adapted for example, to be supplied with live steam, whereby the necessity of a source of live steam is avoided.

Another object is to provide a dual system of energy transmission in which all electrical insulating joints are conveniently located at points of relatively high temperature thereby reducing troubles from leaks, condensation, etc.

Other objects and advantages of my invention will be set forth hereinafter, and in order that my invention may be thoroughly understood I will now proceed to describe the same in the following specification and then point out the novel features thereof in appended claims.

Referring to the drawings:

Figure 1 is a partially diagrammatic view of a system of energy distribution which embodies my invention and is arranged and constructed in accordance therewith.

Fig. 2 is a sectional elevation of one of the points of connection between the transmission main and a branch.

Fig. 3 is a view corresponding to Fig. 2, of a modified arrangement in which the transmitted steam is to be superheated in the distributing branch, as well as at the heat consuming apparatus.

Figs. 4 and 5 are detail views of the joints shown in Fig. 3.

Figs. 6 to 13 inclusive are sectional views of different modifications of dual transmission conductors which may be utilized in a system such as that shown in Fig. 1.

Fig. 14 shows an electric socket or terminal branch of the distributing conductor, adapted to constitute a tap to which electric motors, or other apparatus may be connected.

Fig. 15 is a longitudinal elevation with the outer covering broken away and shown in section, of a modified transmission member which is flexible and is adapted to conduct both steam or other fluid and electricity.

In Fig. 1, 15 represents a steam boiler adapted to generate high pressure steam; 16 a suitable engine such as a steam turbine engine, and 17 an electric generator which is driven by the engine.

In the system illustrated the engine exhaust is primarily relied upon to supply steam to the distributing carrier or transmission member which is designated 18. As fully explained hereinafter, this member is adapted to not only transmit steam but also electricity, the electric mains from the generator to the transmission member being indicated at 19.

If one side of the circuit is grounded, only a single conductor from the generator to the steam pipe is required.

I provide a by-pass 20 including a reducing valve 21, which is closed under most conditions but which may be automatically opened to maintain low pressure steam in the distributing member when an insufficient amount of exhaust steam is available, as, for example, when the engine is running light.

The distributing member may be considered of indefinite length and has connected to it branches 22—23 which supply heat-consuming apparatus such as the matrix drying presses 24—25. At the extreme end of the distributing main is preferably located a receiver 26 and an automatic pump 27 which returns the condensation water to the boiler when a predetermined amount has accumulated in the receiver.

The boiler, engine and generator may represent an isolated plant or private generating station in a factory, for example, or it may represent a generating power plant from which energy is distributed at considerable distances to a large number of customers, as in the so-called "block" systems for example.

It should also be understood that the generator mains 19 may be considered to represent any source of electric energy while the engine exhaust may represent any suitable source of low-pressure steam, for example, the electric energy may be distributed over great distances from a central power plant to sub-station, each sub-station being equipped with suitable transforming apparatus to reduce the voltage of distribution and also equipped with a low pressure steam-generator for example, to supply steam to the transmission member.

The transmission member itself may be formed in various ways, some of which are shown in Figs. 6 to 13 inclusive and Fig. 15, which will now be described.

In Fig. 6 the pipe 30 is protected by a covering or jacket 41 in which is disposed a tubular metal conductor 42 which is substantially concentric with the pipe 30 and is insulated from it. With this arrangement the pipe 30 constitutes one side of the circuit and the tubular conductor 42 the other, and the surface of the latter is preferably polished to minimize the radiation of heat therefrom.

The arrangement of Fig. 7 comprises instead of a single steam pipe, a pair of pipes 43 and 44 which may be of the same or different sizes and which may constitute a supply and return steam line respectively as well as constitute the respective sides of the electric circuit. They are mechanically connected and electrically separated from each other as well as protected against heat radiation by a casing 45 which insulates them both thermally and electrically.

In Fig. 8 a steam pipe 46 is inclosed in an insulating jacket 47 but is eccentrically arranged therein, an electrical conductor or wire 48 being supported and carried at a fixed distance from the pipe in the insulation.

Fig. 9 shows an insulating jacket 50 having a set of holes 51 near the inner surface and another set 52 near the outer surface. Each set is adapted to receive electric wires or conductors and the one or the other will be used according as it is desired to heat the vapor pipe or to merely prevent loss of heat therefrom.

In Fig. 10, 30 represents the steam pipe, 31 a heat insulating jacket surrounding the steam pipe, and 32 a strip of insulation which is mounted upon and may partially or wholly surround the insulating jacket 31. In the insulation 32 are one or more electrical conductors 33.

In Fig. 11 electrical conductors 34 are inclosed in an insulating jacket 35 which surrounds the pipe 30 and which is preferably formed in two sections and held in place by a suitable covering of fabric indicated at 36, and by straps or bands as indicated at 37 in Fig. 2. In Fig. 11 a large number of conductors are shown distributed around the steam pipe 30 but all of the conductors may of course be located in one section of the covering or, as shown in Fig. 12, a separate section 38 may be provided in which the conductors 39 are disposed, the section 38 being arranged to coöperate with sections 40 in completing the pipe covering.

The arrangements of Figs. 6 and 11 have the advantage that the electric current conductors are disposed about or surround the steam pipe and consequently the heat generated in the conductors when current is being transmitted through them, acts as a great protection against the dissipation of heat from the steam pipe and may in fact serve to either maintain or increase the temperature of the steam within the pipe, depending upon the resistivity of the conductors and the current traversing the same.

The connection between the main transmission conductor 18 and a branch such as the branch 23, is particularly simple and durable when high resistance is not required in the branch, because certain of the current conducting wires 34 may be diverted into the branch as shown in Fig. 2, without the necessity for any joints or connectors therein. The conductors are preferably interconnected at intervals to avoid interruptions and to equalize the currents traversing the conductors. Rings 60 as described hereinafter, may be utilized for this purpose.

A joint, such as is shown in Fig. 3 may conveniently be employed between the transmission member 18 and the branch 22 since the conductors in the branch constitute superheaters. The conductors 34 extend continuously of the main transmission member and a conducting ring 60 encircles the insulating jacket near the joint in the pipe. This ring is shown on a still larger scale in Figs. 4 and 5 and is composed of two parts clamped or otherwise secured together by interlocking projections 61 and a binding screw 62. Each of the sections is provided with a plurality of holes 63 through which a connecting hook 64 extends. Each of these hooks encircles one of the conductors 34 and pulls it into contact with an inwardly projecting annular web 65 of the ring, the outer end of the hook being formed into a bolt 66 provided with a binding nut 67. The number of holes in the entire ring will correspond to the number of conductors 34 so that the ring constitutes a means for interconnecting the conductors as well as of forming a connection between the conductors and the ring. The bolt projection 66 and the nut 67 with a washer 69 which sets into a countersunk opening in the hole 63, together constitute a terminal member by means of which connection may be established from the ring to another similar ring 70 which is mounted on the branch 22 near the joint.

The branch differs from the main transmission member in that the conductors 71 are relatively high resistance conductors (being shown by wavy lines to indicate this fact) so that a relatively large amount of heat energy is generated in and imparted to the branch. Thus, the steam in the branch is superheated and this is particularly advantageous because the branch, as shown in Fig. 1, may extend to a machine as indicated at 24 which is to be heated and which need not be provided with an electric heater.

As is frequently the case, the main may be mounted over-head and the branch extend downwardly to the machine, but I prefer to prevent condensation water from settling in the branch by making an upwardly extending curve at the joint as shown in Fig. 1.

In case high resistance conductors are utilized, I may sufficiently increase the temperature of the steam so that it is capable of heating the bed of the machine for example, to the desired temperature, without the necessity of utilizing any electric or other independent heater at the machine itself.

It is of course not necessary to rely entirely upon the resistance conductors in the branch pipe and the branch 23 is intended to illustrate the case where the conductors in the branch maintain or slightly increase the temperature of the steam while an electric heater is provided at the machine to supplement the heat of the steam in imparting heat to the apparatus.

It will be readily understood that the amount of electric heating done in the branch relative to that of the machine, may be varied over wide limits, depending upon the temperature required at the machine, the quantity of heat necessary, etc.

In case high resistance conductors do not constitute an element of the branch, certain of the main circuit conductors 34 may continue from the main, down the branch as indicated in Figs. 1 and 2, and as hereinbefore explained, the remainder of the wires continuing along the main. A number of branches may be supplied in this way until finally the number of conductors in the main is reduced to one or some predetermined number which will then constitute the supply for the last machine on the circuit. In the arrangement of Fig. 2, it will be observed that the apparatus is particularly simple and compact.

The receiver 26 and the pump 27 may be arranged in a well known manner, the pump engine 80 being supplied with steam from a pipe 81 through an automatic valve 82. This valve is actuated by a float 83 in the receiver and supplies steam to the engine when the water in the receiver rises to a predetermined level.

It is evident that details employed in certain of the forms shown in Figs. 6 to 15 inclusive may be combined with others within the spirit and scope of my invention. For example, the insulating jacket of Fig. 9 embodying two sets of longitudinal holes 51 and 52, may be used with the flexible pipe structure of Fig. 15.

My invention is obviously not limited in its field of usefulness to industrial installations and purposes and may advantageously be employed for supplying heat to apartments, dwelling houses, and the like, the low pressure steam being utilized for heating water, heating the house in winter, maintaining the oven or cooker at a predetermined minimum temperature, etc., the electric energy being utilized for superheating the steam for use in certain operations or used separately for producing heat of greater intensity at any given point, or for securing varied physiological effects as in grates or glowers.

Furthermore, my invention is particularly applicable to heating by utilizing the steam or other low temperature heating medium to establish a heat level, materially above the temperature of the atmosphere, from which the electricity may most economically and efficiently build up a relatively high temperature, the steam and electricity acting in conjunction to secure the ultimate heating result.

Various ways of carrying out my invention will suggest themselves to those skilled in this art, and I intend that only such limitations be imposed as are indicated in the appended claims.

What I claim is:

1. A heating system comprising a vapor electric transmission member, a heat-consuming member and an interposed branch transmission member comprising a vapor carrier and relatively high resistance electric conductors adapted to superheat the vapor.

2. A heating system comprising a vapor electric transmission member, a radiator having a vapor passage, an electric heater associated with the radiator, said vapor electric transmission member comprising a vapor carrier, and an electric conductor adapted to superheat the vapor in the carrier.

3. A combined vapor distributing and electric transmission line comprising a flexible pipe having a helical conducting covering, insulation for the covering, and a flexible electric conductor disposed in the insulation, the conductor of the flexible pipe and the flexible electric conductor constituting independent electric circuit transmission conductors.

4. A vapor electric transmission member comprising a pipe of conducting material for the vapor, a tubular casing or jacket of electric and thermal insulating material surrounding the pipe and having a set of longitudinal holes disposed near the pipe and a second set disposed near the outer surface of the insulation, either of said sets of holes being adapted to contain electric conductors for the purpose of either superheating the vapor in the pipe or preventing the radiation of heat from the insulation.

5. A vapor electric transmission member comprising a pipe for the vapor, a tubular casing or jacket of electric and thermal insulation surrounding the pipe and composed of a plurality of longitudinal segments, and a plurality of electric circuit conductors disposed in one of said segments.

6. A heating system comprising a source of steam supply, a high temperature heating agency, and means for transmitting the steam and the high temperature heat agency, whereby the high temperature heating agency is available for boosting and controlling the heat delivered.

7. A heating system comprising a source of low temperature steam, a source of electricity, and means for conducting the steam and electricity whereby the low temperature of steam is independently available for low temperature heating and the electricity for high temperature heating, the low temperature steam and the electricity being adapted to be united for producing intermediate temperatures and for heat regulation.

8. A heating transmission member comprising a steam pipe and electric means for regulating the temperature of the steam delivered at any point by converting a greater or less amount of the electric energy into heat.

9. A heating system comprising a main transmission passage for a heating fluid, a plurality of branch passages therefrom, insulating jackets for said passages and electrical conductors embedded in said insulation and severally extending into the branch passages.

10. A heating system comprising a main transmission passage for low temperature heating fluid, a plurality of branch passages therefrom, insulating jackets for said passages, and electrical conductors embedded in said insulation and severally extending into the branch passages, said electrical conductors being adapted for converting electrical energy into heat for the purpose of regulating and boosting the temperature of the heating fluid delivered.

11. A heating system comprising a steam generator, an electrical generator, a heat translating device and a conductor connecting the translating device with said generators, said conductor comprising a pipe, a thermal and electrical insulator surrounding the pipe and an electrical conductor embedded in the insulator.

12. A heating system comprising a steam generator, an electrical generator, a heat translating device and a conductor connecting the translating device with said generators, said conductor comprising a metallic pipe electrically connected between the electric generator and the heat translating device, a thermal and electrical insulator surrounding the pipe and an electrical conductor embedded in the insulator.

13. A heating system comprising a steam generator, an electrical generator, a heat translating device and a conductor connecting the translating device with said generators, said conductor comprising a pipe, a thermal and electrical insulator surrounding the pipe and an electrical conductor embedded in the insulator, and means for operatively utilizing the generated electricity to supplement and control the heat of the steam.

14. A heating system comprising a steam generator, an electrical generator, a heat translating device and a conductor connecting the translating device with said generators, said conductor comprising a pipe, a thermal and electrical insulator surrounding the pipe and an electrical conductor embedded in the insulator, whereby the steam and the electricity may be transmitted independently to the translating device and means for causing the electricity to supplement and control the heat of the steam.

15. A heating system comprising a main transmission passage for low temperature heating fluid, a plurality of branch passages therefrom, insulating jackets for said passages and electrical conductors embedded in said insulation and severally extending into the branches, the conductors in different branches having unlike heating capacities.

16. A unitary heating fluid and electric transmission line structure comprising a fluid pipe of conducting material, a conductor electrically independent of the pipe and an electric contact device intermediate the ends of the pipe comprising a pair of members, an electrical connection between the pipe and one of the members and an electrical connection between the conductor and the other of the members.

17. A combined vapor distributing and electric transmission line comprising a metal pipe, electric and thermal insulation surrounding the pipe, an electric conductor in the insulation electrically separated from the pipe, the pipe and the conductor constituting independent circuit conductors of the transmission line, and an electric contact device intermediate the ends of the pipe comprising a pair of members, an electrical connection between the pipe and one of the members and an electrical connection between the conductor and the other of the members.

18. The process of distributing and transmitting heat that consists in carrying hot vapor to a point of discharge, and electrically controlling at the point of discharge the temperature thereof.

19. The process of distributing and transmitting heat that consists in carrying hot vapor to a point of discharge, electrically maintaining the temperature thereof while it is being carried and raising the temperature of said vapor at the point of discharge.

In witness whereof, I have hereunto set my hand this 10th day of December, 1915.

WILLIAM S. HADAWAY, Jr.